(12) United States Patent
White et al.

(10) Patent No.: US 12,234,013 B2
(45) Date of Patent: Feb. 25, 2025

(54) METHOD AND APPARATUS FOR DETERMINING NAVIGATION ROUTES BASED ON WEATHER MANIPULATION DATA

(71) Applicant: HERE GLOBAL B.V., Eindhoven (NL)

(72) Inventors: Donta White, Racine, WI (US); Luis Gomez, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 268 days.

(21) Appl. No.: 17/845,221

(22) Filed: Jun. 21, 2022

(65) Prior Publication Data

US 2023/0408288 A1    Dec. 21, 2023

(51) Int. Cl.
| | |
|---|---|
| *B64C 39/02* | (2023.01) |
| *G01C 21/00* | (2006.01) |
| *G01C 21/34* | (2006.01) |
| *G01C 21/36* | (2006.01) |
| *G08G 5/00* | (2006.01) |

(52) U.S. Cl.
CPC ........ *B64C 39/024* (2013.01); *G01C 21/3461* (2013.01); *G01C 21/3691* (2013.01); *G01C 21/3807* (2020.08); *G08G 5/0069* (2013.01)

(58) Field of Classification Search
CPC ............ G01C 21/3691; G01C 21/3461; G01C 21/3807; G01C 21/20; B64C 39/024; G08G 5/0069; G08G 5/0013; G08G 5/0021; G08G 5/0034; G08G 5/0039; G08G 5/006; G08G 5/0086; G08G 5/0091

See application file for complete search history.

(56) References Cited

U.S. PATENT DOCUMENTS

| | | | |
|---|---|---|---|
| 7,898,438 B2 | 3/2011 | Brosius, III | |
| 9,483,951 B1 * | 11/2016 | McCusker | B64D 45/00 |
| 11,037,453 B2 * | 6/2021 | Dawson-Townsend | G08G 5/0091 |
| 11,094,202 B2 * | 8/2021 | Gong | G08G 5/0069 |
| 11,157,867 B1 * | 10/2021 | Jordan | G01C 21/005 |
| 2005/0096842 A1 | 5/2005 | Tashiro | |
| 2010/0245164 A1 * | 9/2010 | Kauffman | G01S 7/22 342/26 B |
| 2016/0106045 A1 * | 4/2016 | Liu | A01G 15/00 239/2.1 |

(Continued)

FOREIGN PATENT DOCUMENTS

| | | | |
|---|---|---|---|
| EP | 2629056 A1 | 8/2013 | |
| KR | 1020180055514 A | 5/2018 | |

(Continued)

*Primary Examiner* — Abdalla A Khaled
(74) *Attorney, Agent, or Firm* — Jeffrey R. Moisan; HERE GLOBAL B.V.

(57) ABSTRACT

A system, method, apparatus, computer readable medium, and user interface for generating a navigation route based on weather manipulation data comprising: receiving weather manipulation data for a geographic or a three-dimensional region associated with at least one candidate route, wherein the weather manipulation data indicates whether there is at least one manmade environmental factor present; and generating the navigation route based on the weather manipulation data for at least one candidate route.

5 Claims, 10 Drawing Sheets

(56) References Cited

U.S. PATENT DOCUMENTS

| | | | | |
|---|---|---|---|---|
| 2016/0202695 A1* | 7/2016 | Deroos | ............... | G01C 21/02 |
| | | | | 701/2 |
| 2016/0328979 A1* | 11/2016 | Postrel | ............... | G08G 5/0008 |
| 2018/0167131 A1* | 6/2018 | Liu | ............... | H04B 3/542 |
| 2018/0292826 A1* | 10/2018 | DeFelice | ............... | G05D 1/0094 |
| 2018/0293898 A1* | 10/2018 | Redmann | ............... | B64U 10/14 |
| 2019/0101934 A1* | 4/2019 | Tuukkanen | ............... | G05D 1/101 |
| 2019/0172348 A1* | 6/2019 | Rivers | ............... | G05D 1/0094 |
| 2020/0207474 A1* | 7/2020 | Foggia | ............... | G05D 1/0676 |
| 2020/0233411 A1* | 7/2020 | Ivanov | ............... | G01W 1/08 |
| 2021/0125507 A1* | 4/2021 | Haider | ............... | G08G 5/0034 |
| 2021/0247513 A1* | 8/2021 | Song | ............... | G08G 5/0078 |
| 2022/0223059 A1* | 7/2022 | Kawiecki | ............... | G01S 13/933 |
| 2022/0261012 A1* | 8/2022 | Ladurini | ............... | G05D 1/1062 |
| 2022/0309934 A1* | 9/2022 | Panchangam | ............... | G08G 5/0052 |
| 2023/0228908 A1* | 7/2023 | Ko | ............... | G01W 1/08 |
| | | | | 73/170.17 |

FOREIGN PATENT DOCUMENTS

| WO | WO2017132304 A1 | 8/2017 |
|---|---|---|
| WO | WO2020121301 A1 | 6/2020 |

\* cited by examiner

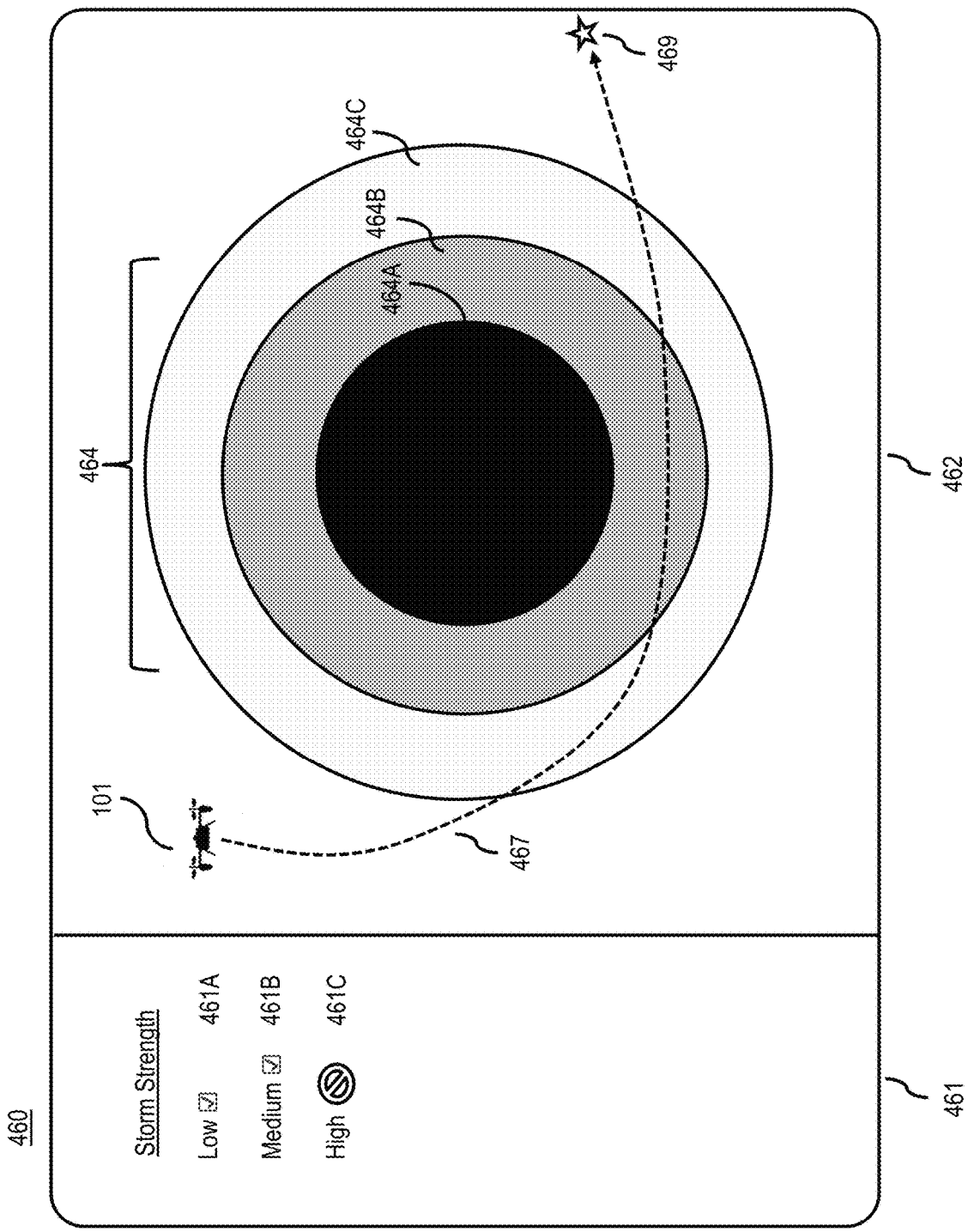

METHOD AND APPARATUS FOR DETERMINING NAVIGATION ROUTES BASED ON WEATHER MANIPULATION DATA

BACKGROUND

As drone delivery becomes an increasingly common way to deliver cargo, ensuring that cargo arrives at its destination unaffected by environmental hazards will become a major issue within the fulfillment processes. For example, the use of unmanned aerial drones for delivering cargo requires extra attention to account for manmade weather events such as cloud seeding. As a result, drone operators and related service providers face significant technical challenges to account for such events.

BRIEF SUMMARY

Therefore, there is a need for an approach for generating navigation routes based on environmental data. It should be noted U.S. application Ser. No. 16/851,929 is herein incorporated by reference in its entirety.

One embodiment of such an approach may be described as a method for generating a navigation route based on weather manipulation data comprising receiving weather manipulation data for a geographic or a three-dimensional region associated with at least one candidate route, wherein the weather manipulation data indicates whether there is at least one manmade environmental factor present and generating the navigation route based on the weather manipulation data for at least one candidate route. This method may further comprise the navigation route being generated for an aerial drone wherein the navigation route specifies an altitude to route the aerial drone based on the at least one manmade environmental factor. The at least one manmade environmental factor may positively or negatively affect the flight of an aerial drone in some embodiments. The navigation route generated by the method and others may avoid the at least one environmental factor (manmade or otherwise). In some embodiments, the navigation route generated may route through the at least one manmade environmental factor. This route may pass through a specific portion of the manmade environmental factor and/or avoid a portion of the manmade environmental factor as well.

In another example, the method above may further comprise initiating an activation of at least one sensor of a vehicle performing the navigation route, wherein the at least one sensor is configured to collect sensor data for determining the presence of the at least one manmade environmental factor. The sensor data may also be used to update map data associated with the at least one manmade environmental factor.

In another example, the method above may further comprise calculating a probability of encountering the at least one manmade environmental factor while on the navigation route; and initiating an evasive maneuver based on the calculated probability. The method above may yet further compromise selecting a candidate route for navigating an aerial drone, wherein the selected candidate route increases flight range for the aerial drone.

Another embodiment may be described as an apparatus for generating a navigation route based on manmade environmental factor data comprising at least one processor and at least one memory including computer program code for at least one program, the at least one memory and the computer program code configured to, with the at least one processor, cause the apparatus to receive data indicating at least one manmade environmental factor, generate map data representing the at least one manmade environmental factor in a geographic database, and provide the map data for generating the navigation route. This apparatus may also feature the map data stored in an environmental data layer of the geographic database.

Additionally, in this example and others, the at least one environmental factor may be classified as affecting the cargo based on determining that the at least one environmental factor negatively affects the cargo so that the cargo cannot be consumed or used in a manner for which the cargo was made or designed. Further, the at least one environmental factor may be classified as affecting the cargo based on determining that the at least one environmental factor positively affects the cargo so that the cargo is preserved to be consumed or used in a manner for which the cargo was made or designed. Still yet further, the map data further represents an altitude extent of the at least one environmental factor, and wherein the navigation route specifies an altitude to route an aerial drone based on the altitude extent, the at least one environmental factor, or a combination thereof.

Another embodiment may be described as a non-transitory computer-readable storage medium carrying one or more sequences of one or more instructions which, when executed by one or more processors, cause an apparatus to perform the steps of determining a cargo to be carried on a navigation route and receiving environmental quality data for a geographic and/or a three-dimensional region associated with at least one candidate route. The medium may then carry out the steps of determining that the environmental quality data indicates that there is at least one environmental factor that is classified as affecting the cargo and generating a map data layer based on the environmental data including the at least one environmental factor, wherein the map data layer is stored in a geographic database.

The non-transitory computer-readable storage medium above may also cause the apparatus to further perform the step of retrieving real-time data, historical data, or a combination thereof indicating the presence of a manmade environmental factor. The non-transitory computer-readable storage medium above may also cause the apparatus to further perform the step of creating a data model representing at least one cloud that has been seeded, wherein the map data layer further includes the data model and/or generating a navigation route based on the data model representing the at least one seeded cloud in combination with terrain data.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: an apparatus comprising means for performing a method of any of the claims.

Still other aspects, features, and advantages of the invention are readily apparent from the following detailed description, simply by illustrating several particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

Also, a computer program product may be provided. For example, a computer program product comprising instructions which, when the program is executed by a computer, cause the computer to carry out the steps described herein.

BRIEF DESCRIPTION OF THE DRAWINGS

The embodiments of the invention are illustrated by way of example, and not by way of limitation, in the figures of the accompanying drawings:

FIG. 4C is a perspective diagram of a user-interface illustrating a manmade environmental factor risk data model, according to one embodiment;

DETAILED DESCRIPTION

Examples of a method, apparatus, and computer program for generating a navigation route based on environmental quality data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
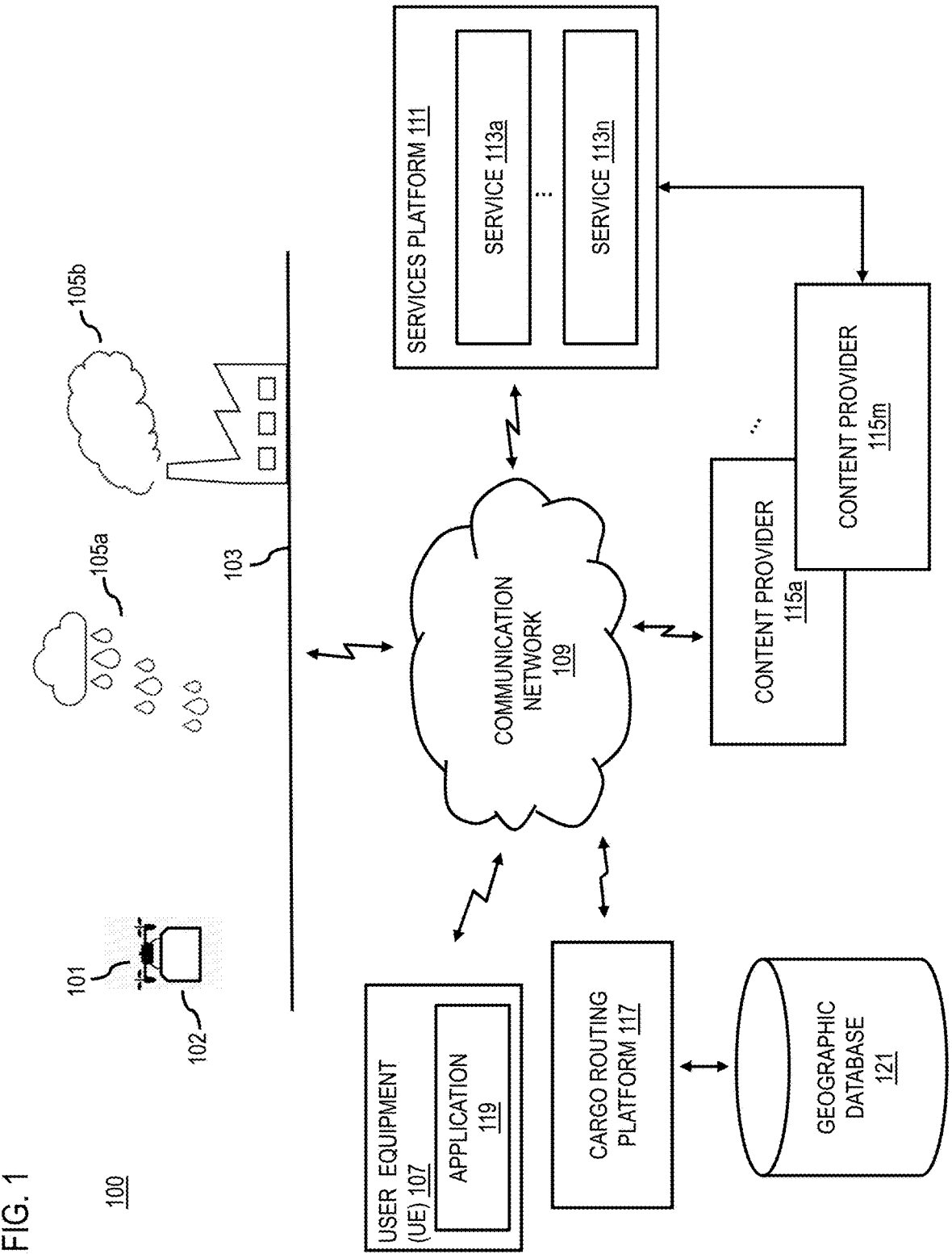
FIG. 1 is a diagram of a system capable of mapping manmade environmental factors and generating navigation routes, according to one embodiment.

FIG. 1 is a diagram of a system 100 capable of generating navigation route data based on environmental data (including weather manipulation data), according to one embodiment. As noted above, the use of aerial vehicles (e.g., aerial drones, unmanned aerial vehicles (UAVs) and/or any other type of remotely operated vehicle) is becoming more widespread particularly for commercial services such as package delivery. Commercial delivery services generally require high target of levels of successful trips (e.g., successfully reaching a delivery location or other destination with cargo). However, as drone delivery services become more common, these services may also face growing risks from environmental factors (e.g., heat, cold, wind, rain, pesticides, air pollution, electromagnetic radiation, radioactive radiation, infectious disease, birds, insects, air pollution, fire, acid rain) encountered along their routes. Therefore, service providers face significant technical challenges to optimize drone navigational routing to ensure successful trip completion in light of threats to the cargo 102 posed by environmental factors.

For the embodiments described herein, the term cargo refers to all types of items and/or packaging suitable for delivery and may be known by other terms including but not limited to cargo, freight, payload, goods, package, parcel, box, bag, shrink-wrap, blister pack or some combination thereof. As used herein, the term environmental factor refers to any manmade or natural factor that is capable of affecting the cargo 102 or an aerial vehicle 101 (such as weather systems).

Although the various embodiments described herein are discussed with respect to aerial vehicles 101 operating in the airspace above the ground, it is contemplated that the embodiments are applicable to any type of vehicle (manned or unmanned, autonomous or manually-controlled) including those operating on the surface of the Earth. For example, in an alternative embodiment, vehicles other than aerial vehicles 101, including but not limited to surface or ground vehicles (e.g., delivery robots, cars, trucks, trains, ships, etc.), can be used according to the various embodiments described herein.

Generally, an aerial vehicle 101 may operate relative to (e.g., above, under, through, in, around, etc.) the ground 103, and/or any other environmental factors that may affect the cargo 102 of the aerial vehicle 101 (e.g., rain 105a, smoke from a power plant 105b, etc. —also collectively referred to as environment 105. In one embodiment, the manmade environmental factors have been geo-referenced to become geo-referenced environmental factors, wherein the environmental factors have been related to a ground system of geographic coordinates and/or corresponding volume of airspace. For example, the smoke/smog from the power plant 105b can be identified based on the geo-coordinates (e.g., latitude and longitude) along with corresponding altitudes describing the boundaries of an airspace volume or plume associated of this geo-referenced environmental factor.

It is noted that the system of denoting a geo-referenced environment factor using latitude, longitude, and altitude of boundary points are provided by way of illustration and not as a limitation. It is contemplated that the system 100 can use any other equivalent means of designating the extent of airspace volume or geographic area that is associated with or otherwise affected by/exhibiting the environmental factor. This includes both natural and manmade environmental factors such as weather events which can be mapped by any functional means. It should be understood that when an environmental factor is referred to as a geo-referenced environmental factor—the underlying environmental factor need not be accounted for by geo-referencing for various embodiments to function, though it could be helpful in some embodiments. For example, the present innovation is fully envisioned to function over bodies of water, large seas, oceans, etc. and the references to the ground/geo-referencing is merely illustrative of some embodiments.

By way of example, an aerial vehicle 101 is tasked to deliver cargo 102, which comprises a cardboard box containing an electronic device. If the cargo 102 passed through the rain 105a, 1) the cardboard would absorb water, expose the electronic device to that water, and damage the device, and/or 2) the cardboard would absorb water, lose its strength, and allow the electronic device to fall through the box, impact the ground, and damage the device. In another example, an aerial vehicle 101 is tasked to deliver fresh dairy as its cargo 102. If the dairy (butter, milk, etc.) is exposed to direct sunlight for too long, it may melt and/or spoil.

To address the technical challenges, the system 100 of FIG. 1 introduces a capability to map manmade environmental factors (such as clouds seeded to produce rain) occurring over a geographic and/or three-dimensional region, and then use the mapped data (geo-reference data) to generate a navigation route over the geographic and/or three-dimensional region that is optimized based on the environmental factors (e.g., by using a routing cost function that accounts for regions with densities of a environmental factor above a threshold density). In one embodiment, the system 100 can also configure an aerial vehicle 101 to react in real-time and/or to re-route based on the mapped historical and real-time data and intelligence on weather manipulation data and/or the presence of manmade environmental factors. In this way, the system 100 can combine optimized drone routes with real-time edge decision making at critical decision points to ensure the success of a cargo delivery.

In one embodiment, to map the manmade environmental factors, the system 100 can incorporate environmental data, such as but not limited to the historical and real-time probe data (e.g., from other drones), sensor data, and/or other available data on manmade environmental factors in a given geographic and/or three-dimensional region. For example, one type of manmade (artificial, manipulated, etc.) environmental factor is a cloud seeding operation. Cloud seeding is a type of weather modification that aims to change the amount or type of precipitation that falls from clouds by dispersing substances into the air that serve as cloud condensation or ice nuclei, which alter the microphysical processes within the cloud.

In this example, the system 100 can query data indicating the presence of cloud seeding (e.g., clouds treated to induce precipitation) in each geographic and/or three-dimensional region encompassing a proposed drone route. In one embodiment, the system 100 can combine the queried data with other environmental data that affects the seeded clouds such as, but not limited to: wind vector data, rainfall data, tidal current data, or some combination thereof to generate map data indicating the historical and/or real-time locations and intensities of precipitation produced by the seeded clouds in the given geographic and/or three-dimensional region.

The map data can represent the manmade environmental factor and/or be stored in an environmental data layer of the geographic database 121. The map data in the geographic database 121 can then be used to predict the behavior of the manmade weather event. In this way, the system 100 advantageously enables drone operators to navigate their cargo 102 with reduced risks or with a greater understanding of the risks arising from encountering a manmade storm on a route. The environmental data layer may include environmental quality data (e.g., air quality, allergen levels, presence of toxic smog, acid rain, etc.) and other functionally useful information about the environment within which a given drone may operate.

In another embodiment, the system 100 generates map data representing a geo-referenced manmade environmental factor, wherein the map data further represents an altitude extent of the manmade environmental factor, and wherein the navigation route specifies an altitude to route an aerial drone based on the altitude extent, the at least one environmental factor, or a combination thereof. By way of example, the system 100 generates map data representing a plume of smoke 105b emitted from a power plant. The map data indicates that the plume has an altitude extent of 30 meters with the base of the plume at an elevation of 70 meters. Based on the map data, the system 100 generates a navigation rout specifying the aerial vehicle 101 to fly at an altitude of 100 meters or higher, altitude extent of 30 meters plus elevation of the plume's base of 70 meters, in order to avoid the plume (e.g., manmade smog). In an embodiment, the system 100 determines the cargo 102's height and width and adds it to the aerial vehicle's dimensions before generating a navigation route. For example, a cargo 102 has a height of 15 centimeters (cm), a width of 15 cm and depth of 15 cm. and is carried attached flush to the aerial vehicle's bottommost member. In an embodiment for this example, the system 100 determines the dimensions of the cargo 102 and aerial vehicle 101 together as a unit then generates a navigation route based on the determined dimensions. The height of the cargo 102 and aerial vehicle 101 together is now their two heights summed together. The width of the of the cargo 102 and aerial vehicle 101 together is the larger of the two dimensions. Similarly, the depth of the of the cargo 102 and aerial vehicle 101 together is the larger of the two dimensions. The generated navigation route based on the determined dimensions more accurately accounts for potential encounters between the cargo 102 and manmade environmental factors.

In summary, the data used by the system 100 to map (geo-reference) manmade environmental factors and/or route/re-route/react/etc. to (or away from) such environmental factors include but are not limited to available real-time and historical data for both manmade and/or natural environmental factors (e.g., heat, cold, wind, rain, pesticides, air pollution, electromagnetic radiation, radioactive radiation, infectious disease, birds, insects, air pollution, fire, acid rain).

In one embodiment, the system 100 enables human and machine pilots or other operators of drones 101 to calculate the risks to cargo 102 associated with a given geographic or three-dimensional region by determining geo-referenced environmental factors. To calculate these risk factors, the system 100 can model (via machine learning, etc.) different types of manmade environmental factors in a given geographic and/or three-dimensional region (geo-referenced environmental factors). This data model can indicate the densities and/or intensities of each manmade environmental factor detected or predicted by the system. The density and/or intensity, for example, indicates to what extent cargo 102 may be affected for a given time of exposure to the manmade environmental factor. The data model can then be combined with terrain data to assist in generating a navigation route for the aerial vehicle 101. In the embodiments described herein, intensity may include any measure that describes a characteristic of an environmental factor such as but not limited to power, amplitude, magnitude, strength, etc.

For instance, in an example scenario, environmental data for a given geographic and/or three-dimensional region indicates that there is a manmade environmental factor—a high-density and high-toxicity plume of airborne pollution (e.g., smog) that reaches a maximum elevation of 50 meters (e.g., based on real-time environmental data obtained through the sensor of other drones and/or historical research data). The system 100 classifies a manmade environmental factor as affecting a cargo based on determining that the manmade environmental factor negatively affect the cargo so that the cargo cannot be consumed or used in the manner for which the cargo was made or designed. In this example, the system 100 has modeled that a cargo 102 of baby food, if exposed to the smog in that given region for more than 2 minutes, would be negatively affected to an extent that makes the baby food unfit for consumption and classifies the manmade environmental factor as affecting the cargo. The system 100 further models that there is a 60-meter-tall hill west of the region. Thus, the system 100 may determine that an aerial vehicle flying west to avoid the region of smog may still affect the cargo by impacting the hill if flying at altitudes of 60 meters or lower. Utilizing this data model, the system 100 can then generate a navigation route so that the cargo 102 of baby food is not so affected as to become damaged or unfit for consumption.

In another embodiment, the system 100 identifies in environmental data of at least one geo-referenced manmade environmental factor that positively affects the cargo so that the cargo is preserved to be consumed or used in a manner for which the cargo was made or designed. The system 100 then generates a navigation route to go through the at least one geo-referenced environmental factor. For example, the presence of dense clouds generated by cloud seeding may provide additional shade/cover which can be useful for perishable cargo which must remain chilled. Many robust drones can travel through the rain so, in some examples, the system 100 may purposefully route drones carrying cargo which needs to be kept cool into/under manmade rain clouds to avoid the sun.

In yet another embodiment, the system 100 identifies environmental data for at least one manmade geo-referenced environmental factor that could negatively affect the drone and/or its cargo. If the system 100 determines that the is a danger posed to the drone/cargo, the system 100 generates a navigation route to go around the at least one geo-referenced environmental factor. For example, some storms may be manipulated and strengthened into a storm with strong winds, hail, gales and/or thunderstorms. Such strong winds, lighting, etc. might hamper drone flight and should be avoided.

In one embodiment, the system 100 can then represent or visualize the calculated risks as a "risk data layer" of the geographic database 121 for the geographic and/or three-dimensional region where the drone and its cargo will travel through. In one embodiment, the visual representation or "risk data layer" highlights or otherwise indicates the risk to the drone or cargo of travelling through a region represented by the risk data layer based on data such as but not limited to the density and/or intensity of geo-referenced manmade environmental factors. In other embodiments, the risk data layer is a combination of risks composed of one or more other risk factors (e.g., visible or invisible) associated with the safety of the cargo, drone, people and/or environment in the event of a crash. Those risk factors include but are not limited to geographic features, terrain, buildings, bodies of water, nature preserves, etc. in combination with the risks from the geo-referenced manmade environmental factors.

On example representation of the "risk data layer" is an indication of density of at least one geo-referenced manmade environmental factor over a region of interest. When rendered on or near a corresponding location, the density can appear as a "cargo risk column" rising from the location, so that the aerial vehicle 101 or its operator can visualize the risk from the at least one geo-referenced manmade environmental factor as a "virtual object" to avoid in a similar manner to other physical obstacles (e.g., buildings), in one embodiment. In another embodiment, the density can appear as a "cargo risk heat map" on the ground or in the air.

As indicated above, the extent (e.g., density, intensity, toxicity, coverage) of geo-referenced manmade environmental factors can represent the aggregated risk for a given location in the geographic and/or three-dimensional region. For the example, the height and/or any other dimension of the visual representation of the risk data layer can be scaled to be proportional to the calculated risk level for the region. In one embodiment, the height of the risk data layer is a function of time and hence creates a user interface with a dynamic landscape of multiple risk data layers that go "up and down" over the course of the day or other period of time to reflect the frequently changing patterns of the risk function aggregating the extent of the geo-referenced manmade environmental factors for a region of interest that can affect the drone and/or cargo.

In one embodiment, the system 100 also includes a capability to dynamically predict manmade environmental factor data (e.g., in real-time) for a given region based on collecting data from various data sources of human activity in the region, and then using the data to make the predictions of manmade environmental factor data. In one embodiment, dynamic prediction of manmade environmental factor data refers to predicting or estimating the intensity of a seeded cloud can differentiate based on dynamic factors such as but not limited to time (e.g., time of day, duration of cloud seeding operation, general information about the cloud before and after seeding, etc.) and expected future events (e.g., temperature inversions, calm winds, other natural weather in the area, etc.). The embodiments of dynamic geo-referenced manmade environmental factor data described herein enables dynamic modeling of geo-referenced environmental factor flows in a region of interest so that geo-referenced environmental factors can be determined or predicted with greater temporal granularity.

In another embodiment, the system 100 receives additional environmental data for a geographic and/or three-dimensional region associated with at least one candidate route for the drone (and its cargo) to follow. The additional environmental data indicates at least one geo-referenced manmade environmental factor that may affect the drone or cargo. The system 100 then generates a navigation route to avoid the at least one geo-referenced environmental factor based on the additional environmental data and provides the navigation route as an output. For example, if an end user of a drone carrying cargo wants to extend the flight range of the drone, they may be able to harness the winds of a manmade storm to push the drone along (or avoid head winds from such a storm). Another example could be a drone with solar panels installed upon it to help generate power. Such a drone might be able to travel along an optimized route which exposes it to both the most sun possible and also takes advantage of the prevailing winds generated by a manmade storm to push the drone along and also provide it with adequate solar power.

In one embodiment, the dynamic geo-referenced manmade environmental factor data along with other risk factors can be used to predict the risk levels to the drone or its cargo in regions where the drone will pass through. In other words, the system 100 enables the capability to quantify the risk levels that the drone and/or cargo may meet on the way by generating a risk data layer or a risk data model of the aggregated risks of regions at a time when the drone and its cargo are predicted to pass through the regions. In one embodiment, the system 100 can then route a drone 101 and the cargo 102 to avoid regions with risk levels above a threshold value or determine a route along which the done and its cargo is expected to pass through with a minimum level of risk.

According to another embodiment, the system 100 comprises at least one processor; and at least one memory including computer program code for at least one program, the at least one memory and the computer program code configured to, with the at least one processor, cause the apparatus to: receive data indicating at least one geo-referenced environmental factor that is classified as affecting a drone or its cargo that is carried on the navigation route; generate map data representing the at least one geo-referenced environmental factor in a geographic database; and provide the map data for generating the navigation route. The map data is stored in a data layer of the geographic database.

It is noted that the aerial vehicle use case is one example application of dynamic geo-referenced manmade environmental factor data. It is contemplated that the embodiments of dynamic geo-referenced environmental factor data described herein can be for any application including but not limited to autonomous vehicles, fleet vehicles, (e.g., delivery vehicles), delivery robots, emergency vehicles, shared vehicles, private vehicles, etc.

Figure 2:
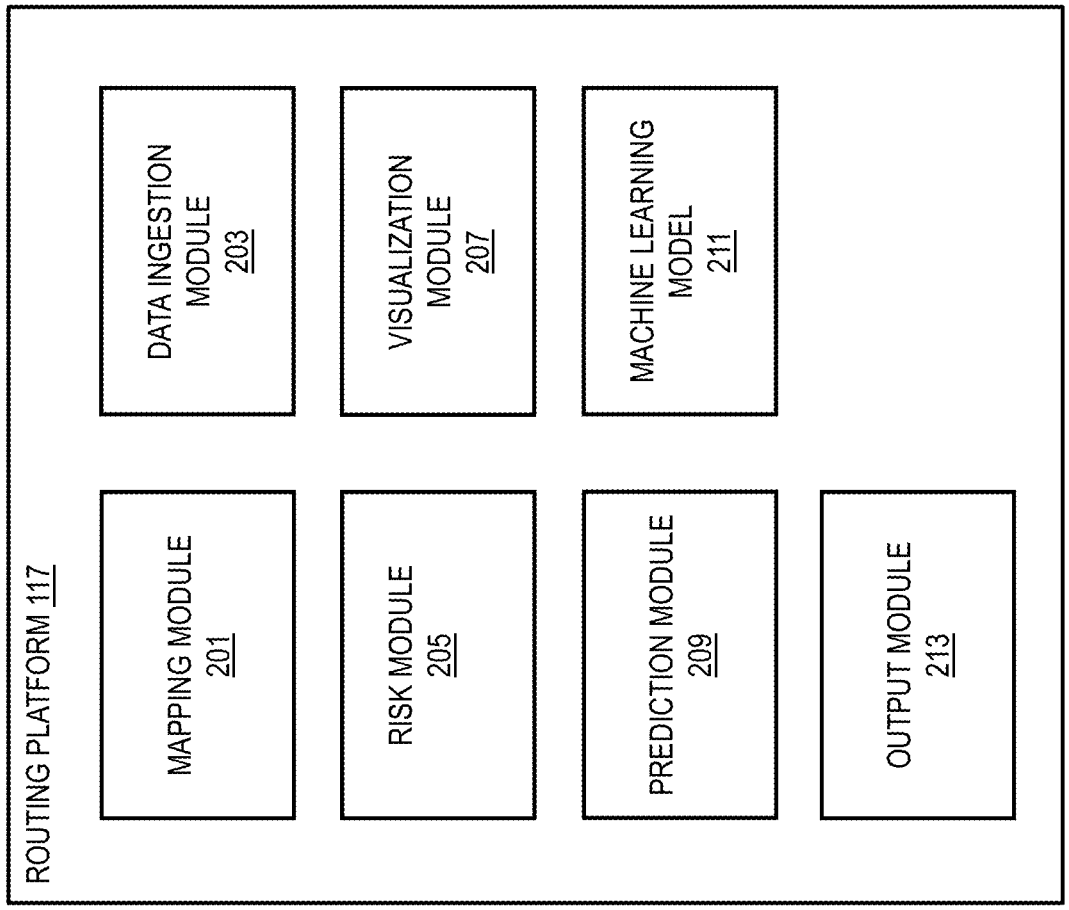
FIG. 2 is a diagram of the components of a routing platform, according to one embodiment.

In one embodiment, the routing platform 117 includes one or more components for providing environmental quality data modeling according to the various embodiments described herein. As shown in FIG. 2, the routing platform 117 (for drones and their cargo, etc.) includes a mapping module 201, a data ingestion module 203, a risk module 205, a visualization module 207, a prediction module 209, a machine learning model 211, and an output module 213. The above presented modules and components of the routing platform 117 can be implemented in hardware, firmware, software, or a combination thereof. It is contemplated that the functions of these components may be combined or performed by other components of equivalent functionality. Though depicted as a separate entity in FIG. 1, it is contemplated that the routing platform 117 may be implemented as a module of any of the components of the system 100 (e.g., a component of the aerial vehicle (e.g., drone) 101 and/or a client device such as UE 107). In another embodiment, the routing platform 117 and/or one or more of the modules 201-213 may be implemented as a cloud-based service, local service, native application, or combination thereof. The functions of these modules are discussed with respect to FIGS. 3-4 below.

Figure 3:
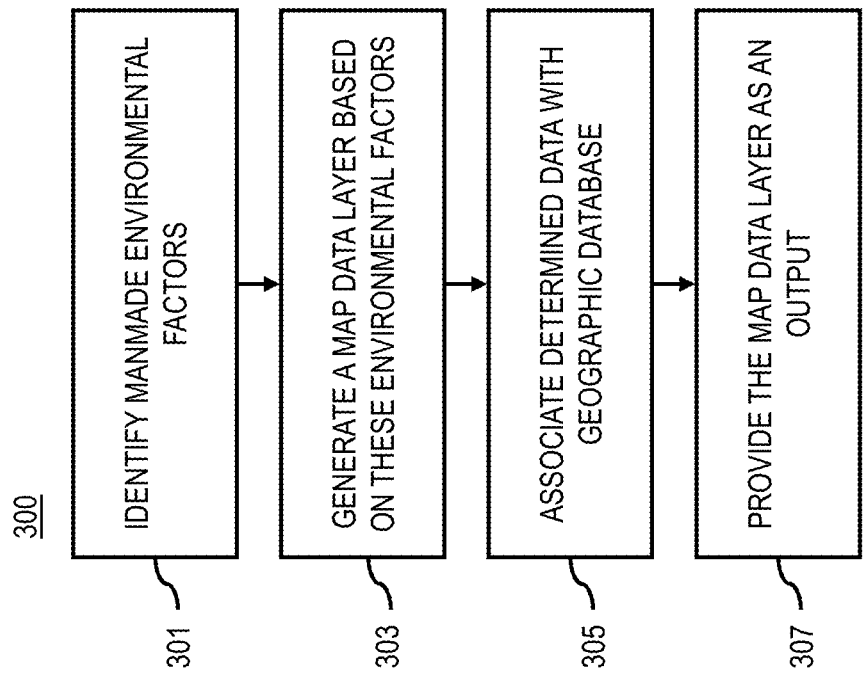
FIG. 3 is a flowchart of a process for mapping manmade environmental factors, according to one embodiment.
Figure 7:
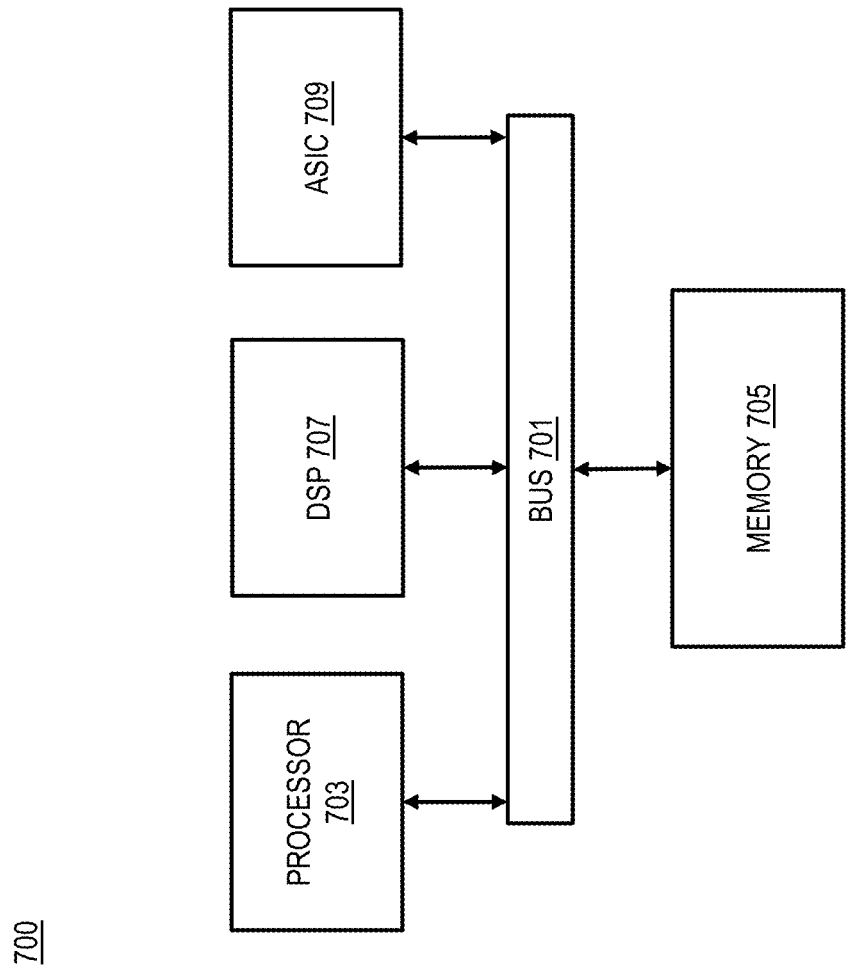
FIG. 7 is a diagram of a chip set that can be used to implement an embodiment.

FIG. 3 is a flowchart of a process for mapping manmade environmental factors and generating navigation routes, according to one embodiment. In various embodiments, the drone routing platform 117, any of the modules 201-213 of the routing platform 117 may perform one or more portions of the process 300 and may be implemented in, for instance, a chip set including a processor and a memory as shown in FIG. 7. As such, the routing platform 117 and/or any of the modules 201-213 of the routing platform 117 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all the illustrated steps. More specifically, the process 300 illustrates a process for creating and storing a digital map representing manmade environmental factors for a given geographic or three-dimensional region.

In one embodiment (e.g., in step 301), the mapping module 201 initiates the navigational routing process by identifying manmade environmental factors. It is contemplated that the mapping module 201 can use any means or data sources for identifying the manmade environmental factors. For example, the manmade environmental factors can be determined by sending out dedicated mapping vehicles or drones to identify potential environmental factors and their corresponding characteristics such as but not limited to location, density and/or intensity. These mapping vehicles or drones can also be equipped with sensors (e.g., LIDAR, RADAR, cameras, etc.) to map or record the environmental factors and their characteristics (e.g., as high-resolution mesh point cloud data, 3D models, doppler radar, image data, etc.). The mesh or model data can be a polygonal or other mathematical representation of the environmental factor that are mapped to geographic coordinates to provide geographically accurate representations of the environmental factors. The mesh or model data can then be included as part of digital map data representing geo-referenced environmental factors in the geographic database 121. In addition or alternatively, the mapping module 201 can query or process available blueprints, diagrams, databases (e.g., county databases of agricultural or industrial zones, local air quality databases), etc. to identify potential environmental factors.

In another embodiment, in step 301, the risk module 205 receives map data indicating manmade environmental factors over a geographic and/or three-dimensional region. In one embodiment, the data ingestion module 203 retrieves real-time data, historical data, or a combination thereof indicating the spatial concentration of the environmental factors, and calculates the spatial concentration based on the real-time data, the historical data, or a combination thereof.

According to an embodiment, manmade environmental factor data can be collected and stored as a data layer or other record of the geographic database 121. It is contemplated that real-time manmade environmental factor data can be collected and/or stored alone or in combination with the digital map data of environmental factors. In one embodiment, the data ingestion module 203 can query the real-time environmental data from external databases or services providing the data (e.g., the services platform 111, services 113, content providers 115, etc.). In another embodiment, the data ingestion module 203 can determine the relevant real-time geo-referenced environmental data from external databases or services providing such environmental data (e.g., data on natural weather systems, etc.).

By way of example, in cases where manmade environmental factors include cloud seeding data, wind data is critically important in generating or mapping a navigation route. The data ingestion module 203 can monitor wind speeds and directions, or wind vectors, as part of the collected real-time data. Such data can be determined and/or predicted from weather data (e.g., queried from a weather service). In some cases, manmade smog (e.g., heavy air pollution) can also impact drone flight by blocking out the sun, disrupting airflow, etc. This information may also be captured by the system, apparatus, etc. in some embodiments including georeferencing data.

In another embodiment, the data ingestion module 203 can sense, determine, retrieve, and/or query a geographic database 121 or equivalent for any manmade environmental factor data. For example, the probability of ultraviolet light (UV) exposure for a drone (and its cargo) can be calculated by the risk module 205 according to environmental factor data located in the geographic database 121, such data including but not limited to historical UV index values, which may further include data on time of day, angle of the sun to the earth, level of cloud cover and/or smog cover, and elevation.

The geographic or three-dimensional region in which a drone and/or its cargo may be affected by a given manmade environmental factor is represented by a risk zone. For example, the risk zone can be defined as a circle, cloud, any other shape, any color and/or any pattern (e.g., rectilinear polygon, dome, Voronoi shape, hatch marks, dot patterns, etc.) forming a location of the geo-referenced environmental factor (see FIG. 4A for an example).

In step 303, the prediction module 209 generates a map data layer of a geographic database based on the density and/or intensity of manmade environmental factor(s). In one embodiment, the type of shape for a risk zone is represented by or corresponding type of environmental factor density and/or intensity. By way of example, a rectangular-shaped risk zone may indicate the location of winds generated from a portion or area of a storm while green might indicate that the level of wind is safe for drone flight. Alternatively, another portion of the same storm system (or another) might produce be too strong of winds and thus be indicated to an end user as a red rectangle instead.

Figure 4A:
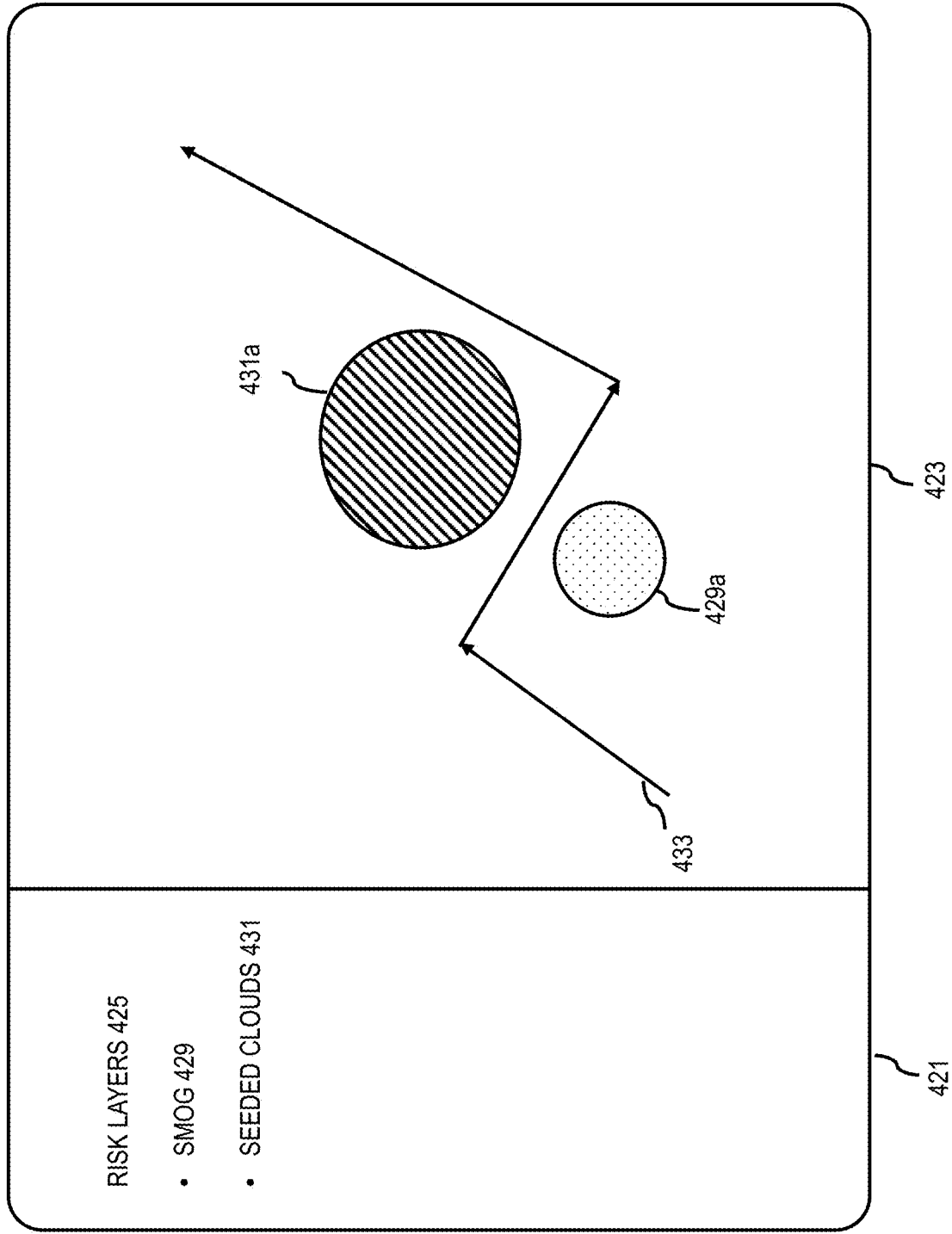
FIG. 4A is a diagram of a user interface illustrating manmade environmental factors, according to one embodiment.

FIG. 4A is a diagram of a user interface illustrating spatial concentrations of environmental factors (manmade and otherwise) as part of one embodiment. In FIG. 4A, the user interface (UI) 420 includes a first element 421 for presenting information on different risk layers 425 and a second element 423 for presenting spatial concentrations of different geo-referenced environmental factors. For example, the first element 421 lists different risk data layers 425 for different manmade environmental factors such as smog 429, a cloud which has been seeded to produce precipitation 431, etc. FIG. 4A shows two risk zones 429*a* and 431*a* (which correspond to smog and seeded clouds respectively) on the UI 420.

By way of another example, based on thresholds for the densities and/or intensities of manmade environmental factors in risk zones in the geographic and/or three-dimensional region, the risk module 205 determines a pattern for the circles or other shapes that indicate the type of environmental factor in a risk zone, while the sizes of the circles or other shapes reflect the intensity of the environmental factor. In one embodiment (e.g., FIG. 4A), the visualization module 207 generates a representation of the risk zones of all types of manmade environmental factors. In another embodiment, the visualization module 207 generates a representation of the risk zones as a risk data layer per type of manmade environmental factors.

In one embodiment, the visualization module 207 can use a trained machine learning model 211 or equivalent to predict a risk level for a given zone based on the aggregated manmade environmental factors of a region. For example, the trained machine learning model 211 can be trained using aggregated ground truth risk-related data that has been labeled or annotated with a known or ground-truth risk level. The risk factors aggregated from the geographic and/or three-dimensional region can be used as input features to the trained machine learning model 211 to output a risk level prediction and optionally a corresponding confidence level of the prediction.

For some embodiments, trip planning by a pilot/controller may consists of picking a route which has no or low risk volume or risk data layer on the flight path (e.g., no crossing of any rendered risk zone). By way of example, the flight path 433 can be drawn or computed to avoid passing through any 3D risk zones of one or more of the risk data layers, to minimize safety risks along the flight path 433. In one embodiment, a risk zone is avoided horizontally by flying around on the same plane of travel. In another embodiment, a risk zone is avoided vertically by flying at a different altitude/height. The mapping module 201 can determine a required altitude change(s) based on the data model representing the coverages of environmental factors in combination with terrain data for the geographic and/or three-dimensional region.

In one embodiment, the mapping module 201 retrieves a ground elevation or equivalent terrain data of a location that the aerial vehicle 101 is to fly over or to approach within a distance threshold. This ground elevation or terrain data can be retrieved from, for instance, the geographic database 121 or other equivalent data store providing ground elevation data. The mapping module 201 can then interact with the prediction module 209 to predict the type of environmental factors (e.g., air pollution, seeded clouds, etc.) that may be encountered according to the embodiments described herein. Based on the prediction, the risk module 205 determines an area within which the environmental factors could affect the drone and/or cargo as they pass.

By way of example, using the ground elevation data and determined range of the environmental factor(s), the mapping module 201 can determine an altitude or altitude change (e.g., how much higher the aerial vehicle must fly on a route relative to a route on which no environmental factors are expected or predicted) to generate on a route over the location. For example, if a location has a ground elevation of 30 meters above sea level and the routing platform 117 predicts that a environmental factor such as a heavy smog at 25 meters above ground level is expected at a location, the routing platform 117 can generate a route that takes an aerial vehicle 101 carrying that cargo 102 at least 55 meters high (e.g., ground elevation plus elevation of manmade environmental factor above ground) to avoid being within range of the smoke plume. In one embodiment, the mapping module 201 can add a safety margin to the recommended altitude, for instance, by applying a multiplicative factor to the range of the environmental factor (e.g., a factor of 1.5 times so that in the example above the altitude would be 67.5 meters based on a ground elevation of 30 meters plus 1.5× the 25 meter elevation above ground level of the smog).

If a risk zone cannot be avoided, the pilot/controller could then take the route with the lowest risk (e.g., crossing risk zones with lower risk levels). This is especially useful when the pilot/controller needs to adapt to changing conditions while flying (e.g., during rerouting of a flight path) as the pilot will need to make very quick decisions on-the-fly. For example, cloud seeding is an inexact solution and thus it is impossible to predict where the wind, rainfall, thunderstorm, etc. produced by such an operation will occur with 100% certainty. The present innovation enables tracking of such manmade weather events in real time, with the risk posed to drones and their cargo accounted for in real time as the strong winds, etc. occur. This enables real-time routing around such manmade weather events. Data concerning the behavior of manmade weather events can also be stored, categorized, aggregated, and analyzed to better account for the behavior of manmade weather events.

In one embodiment, the routing platform 117 uses an ability of a computer program (or software) or a neural network (artificial intelligence) of the aerial vehicles 101 to create an optimal delivery route, react in real-time and/or reroute (or recreate route) the aerial vehicles 101 and hence their cargo 102, based on historical and real-time data and intelligence combined with real-time edge decision (such as split-decision, decision-point, cloud-decision) making at critical decision points for ensuring success of deliveries.

As mentioned above, the prediction module 209 may use one or more machine learning models to predict when and where manmade weather events might occur. Such predictions can be made based on the real-time data observed by the system, apparatus, etc., and also based on historical data. For example, if a specific set of factors results in heavy smog present over a city, these factors may be observed and recorded by the system to analyze similarly situated areas to predict the presence of smog at a future date. This is useful for generating an initial route for an aerial drone which can then be optimized based on real-time data which confirms the presence of any manmade weather events which could impact a drone or its cargo.

Figure 4B:
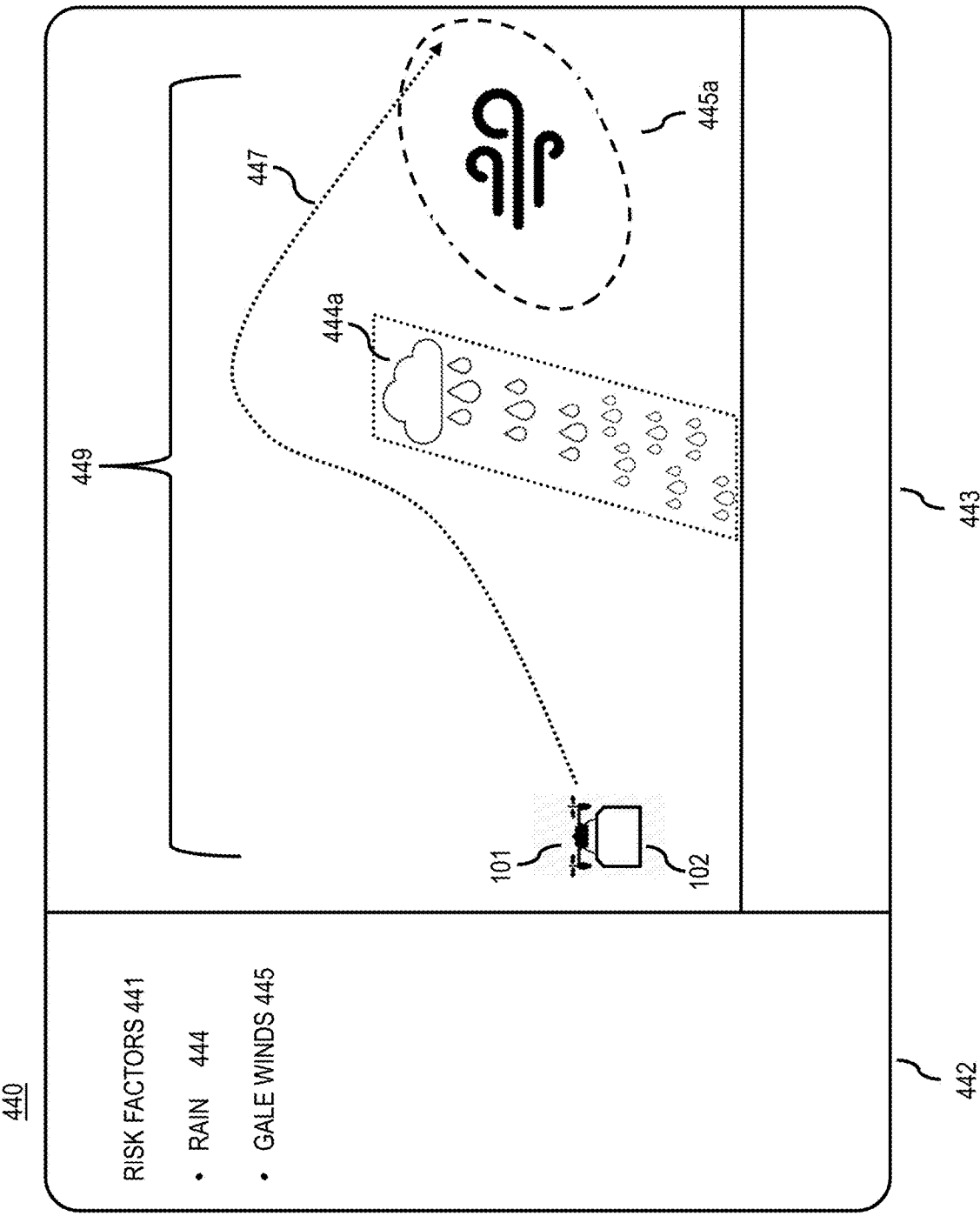
FIG. 4B is a diagram of a user-interface illustrating a manmade environmental factor model, according to one embodiment.

FIG. 4B is a diagram illustrating an example of manmade environmental factors modeled by a user interface as part of one embodiment. In one embodiment, the risk module 205 determines the drone 101, cargo 102, and the manmade environmental factors, and the visualization module 207 generates the representation of the manmade environmental factors risk data that considers a vertical risk zone of geo-referenced manmade environmental factors.

In FIG. 4B, the UI 440 includes a first element 442 for presenting information on different manmade environmental factors and a second element 443 for presenting the risk data. For example, the first element 442 lists different risks 441, such as the manmade environmental factors rain 444 produced from cloud seeding and the resulting gale force winds 445 produced from the seeded storm and listed as part of UI element 442.

In the embodiment illustrated by FIG. 4B, the routing platform 117 determines the drone and cargo and presents the distributions of different manmade environmental factors in a given geographic and/or three-dimensional region as a visual model 449 shown in UI element 443, associated with a route for the drone and its cargo to travel through the geographic and/or three-dimensional region. For example, the visual model 449 includes rain 444a produced from cloud seeding and gale force winds 445a produced from the same seeding event. In some embodiments, the model 449 simultaneously indicate the type of manmade environmental factors present in a given location as well as that factor's density and/or intensity. In this example, the model indicates manmade geo-referenced environmental factors. The model may also indicate one or more natural geo-referenced environmental factors (e.g., a naturally occurring storm).

In this example, the rain 444a presents a risk of damaging the cargo 102 and thus the suggested route 447 avoids the geolocation with rain 444a. The route 447 suggests flying over the rain 444a at a higher altitude. The strong wind 445a produced in front of the rain 444a actually aids the flight of the drone 101 to its destination (in this example) and poses no risk to the cargo 102 (in this example) so the route 447 actually navigates to a lower altitude once past the rain 444a to make user of the wind 445a. It is noted that the embodiment of FIG. 4B is provided by way of illustration an example embodiment and not as a limitation.

FIG. 4C is a perspective diagram illustrating an example of a manmade environmental factors risk data model, according to one embodiment. In one embodiment, the risk module 205 determines the drone and the environmental factors, and the visualization module 207 generates a representation of an environmental factors risk data model that considers a risk zone of manmade geo-referenced environmental factors (in this example).

In FIG. 4C, the UI 460 includes a first element 461 for presenting information on risks associated with environmental factors. The UI 460 includes a second element 462 for presenting a risk data model 464.

In the embodiment illustrated by FIG. 4C, the routing platform 117 determines the drone's capabilities, cargo, etc. and presents the distribution of different environmental factors (manmade or otherwise) in a given geographic and/or three-dimensional region as risk model 464, associated with relative strength(s) of the manmade weather (e.g., cloud seeding event) and a route by which a drone 101 may travel through the geographic and/or three-dimensional region. For example, the risk model 464 includes concentric rings which represent relative storm strength of a seeded cloud. In this example, the center of the storm 464A is shown in black representing the strongest portion of the storm. Based on the drone's capability and cargo, in this example, the system, apparatus, etc. has assessed that the drone 101 is not capable of traversing this portion of the manmade weather event and thus should be routed around it. This information is confirmed in section 461 as the warning readout 461C. It should be noted that the strength of a given weather event may be assessed in real-time via data from the National Weather Service, etc. and/or observed by the system via the use of weather measuring sensors like radar, barometers, lighting detectors, etc.

In the embodiment, the risk models 464 indicates two additional levels of storm strength as detected by the system, apparatus, etc., based on predictive models and/or real-time data observed by various sensors. A medium level of storm strength is indicated by grey ring 464B and corresponding readout 461B. Based on the drone 101's various abilities (e.g., number of rotors, size, battery power levels, etc.) the system determines the drone can successfully navigate the medium strength area of the storm as well as the low strength area (light grey ring 464C and readout 461A). Based off this information, the system generates a proposed route 467 which evades the portion of the storm risk model 464 which is too strong while also navigating to the delivery location 469 as efficiently as possible. Factors such as prevailing winds and maximizing travel time through certain portions of the storm (e.g., lower strength areas with less wind in this example) may also be accounted for by the system.

In one embodiment, the prediction module 209 creates a data model representing the density and/or intensity of various environmental factors. In one instance, the map data layer further includes the data model. In another instance, the data model includes the map data layer.

In step 305, the mapping module 201 associates the determined manmade environmental factors with a geographic database 121. In one embodiment, "associating" refers, for instance, to storing a data record representing the manmade environmental factors in the digital map data stored in the geographic database 121. For example, the environmental factor data record can include data fields such as but not limited to an environment factor description or type, types of cargo affected by the environmental factor, geographic extent of the environmental factor, georeferencing data, etc.

In one embodiment, the environmental factor data record can be referenced to specific node/link data records of the digital map data of the geographic database 121. In one embodiment, the data records representing the environmental factors can be incorporated as additional records of the geographic database 121. Alternatively, the manmade environmental factor data records can be stored as a separate data layer of the geographic database 121. A data layer, for instance, groups the data records of the geo-referenced environmental factors as a discrete and severable subset of digital map data of the geographic database 121. In this way, the system 100 can deliver or publish the environmental factors data records as a separate map data layer from the other data of the geographic database 121 (e.g., to facilitate delivery of the map data layer only to those devices that are requesting the data to reduce the map data size for those devices that do not request the map data layer). It should be noted that the environmental factor data may include data on both natural and manmade weather events. The data on these weather events may be georeferenced in some embodiments.

In step 307, the mapping module 201 provides the map data layer as an output. By way of example, the mapping module 201 routes an aerial vehicle over the geographic and/or three-dimensional region based on the map data layer. The route can be determined using any routing engine known in the art based on an origin and destination specified by a pilot/controller of the aerial vehicle 101 for the route at a given time (e.g., expected start time of the route). In one embodiment, the aerial vehicle is a delivery drone, and wherein the determined route is configured to pass through a manmade environmental factor.

For route planning, a pilot/controller may pick a route which does not cross any risk zone. If that is not possible, the pilot could then take the route with the lowest risk (e.g., crossing areas with manmade weather which presents lower risk levels). This is especially useful when the pilot/controller needs to adapt to changing conditions while flying (e.g., during rerouting of a flight path) as the pilot will need to make very quick decisions on-the-fly.

In one embodiment, the mapping module 201 determines a route over the geographic and/or three-dimensional region based on the data model representing the densities and/or intensities of the geo-referenced environmental factors in combination with terrain data for the geographic and/or three-dimensional region. The densities and/or intensities of the environmental factors may include real-time environmental quality data, and the mapping module 201 calculates a real-time routing instruction based on the real-time environmental data. In another embodiment, the real-time routing instruction is calculated by a local component of the aerial vehicle for real-time use by the aerial vehicle.

In one embodiment, the route is calculated using a cost function based on minimizing a probability of the aerial vehicle encountering manmade environmental factors over the geographic and/or three-dimensional region. By way of example, the probability considers the density and/or intensity of the manmade environmental factors, the terrain data for the geographic and/or three-dimensional region, other risk factors as discussed, etc.

In one embodiment, the data model further indicates a predicted damage level to the aerial vehicle, a payload of the aerial vehicle, or a combination thereof that is calculated to be inflicted by the manmade environmental factors, and the routing is further based on the predicted damage level.

In one embodiment, the prediction module 209 or the local component of the aerial vehicle calculates a probability of encountering at least one manmade geo-referenced environmental factor while on the navigation route based on the environmental quality data, and the mapping module 201 initiates an activation of at least one sensor of the aerial vehicle performing the navigation route. For instance, the at least one sensor is configured to collect sensor data for determining a presence of the at least one geo-referenced environmental factor, such as a camera, a LIDAR system, and/or air-quality sensor for detecting and/or measuring the at least one geo-referenced environmental factor, etc. In one embodiment, the sensor data is used to update the environmental quality data, map data associated with the at least one geo-referenced environmental factor, or a combination thereof, such as one or more LIDAR systems detecting the at least one geo-referenced environmental factors, etc.

In another embodiment, based on the probability of encountering at least one manmade geo-referenced environmental factor while one the navigation route, the mapping module 201 or the local component of the aerial vehicle initiates an evasive maneuver by the aerial vehicle based on determining that probability is greater than a threshold probability. By way of example, the aerial vehicle flies above, around, or below the one or more risk zones in the data model. In another example, the aerial vehicle flies via the one or more risk zones faster than a threshold reachable by the at least one geo-referenced manmade environmental factor.

In one embodiment, electromagnetic field data can be sensed using sensors located on aerial vehicles 101, in the infrastructure (e.g., smart city infrastructure), and/or from any other sensor in the region of interest. In addition, or alternatively, historical or previously sensed electromagnetic data that has been stored for the regions of interest along the navigation route can be stored and retrieved from the geographic database 121. Data on the absence of GPS or other location signals in the regions of interest can also be sensed or retrieved from the geographic database 121.

Regions with no or low GPS reception or equivalent (e.g., regions with high multi-path signal interference) can cause the aerial vehicle 101 to have inaccurate positioning information. Weather data (e.g., winds or other weather conditions) can be retrieved from weather services or applications provided by the services platform 111 and/or any of the services 113a-113n. Wind or weather conditions that exceed the operational capability of the aerial vehicle 101 can cause the aerial vehicle 101 to be more susceptible to being blown off course or into other objects, or from weather related damage (e.g., lightning strikes, hail damage, snow, etc.). Network coverage data can be retrieved from the communication network 109, services platform 111, and/or services 113a-113n. Network coverage data can include cellular or other data network signal strength or availability. Losing communications connections between the aerial vehicle 101 and a corresponding remote pilot, remote operator, or remote data service can increase safety risks. Finally, aviation-related data such as air traffic, flight restrictions, etc. can be retrieved from the services platform 111, services 113a-113n, and/or geographic database 121. By way of example, increased air traffic in the geographic can increase safety risks of colliding with other aerial vehicles.

It is noted that the above risk factors are provided by way of illustration and not as limitations. It is contemplated that data on any other location-based geo-referenced manmade environmental factor that can affect an aerial vehicle's cargo over a region of interest can be sensed/retrieved and incorporated into the risk data layer and/or the risk data model according to the described embodiments.

Visualization or rendering of the risk data layer could be offered on a plurality of user interfaces for various purposes including but not limited to: (1) an application for trip planning (e.g., on a desktop computer or device); (2) an augmented reality (AR) view for live visualization by the pilot, co-pilot, and/or any other user; (3) an on-device dashboard interface; (4) an autonomous system use (e.g., for a pilot/controller of the aerial vehicle 101, other data post processing uses, etc.); and/or the like.

In one embodiment, as described above, the calculated risk levels for the regions of interest can be time sensitive. In other words, the level of risk can be a function of time by updating the environmental data collected from the regions of interest in real-time, continuously, periodically, according to a schedule, or a combination thereof. The updated environmental data or risk factors can then be used to update the risk data layer and/or the risk data model associated with the flight path. In this way, the visualization module 207 can dynamically adjust at least one dimension (e.g., height) of the risk data layer/model as function of time.

The embodiments of visualizing risk levels or aerial vehicle flights described herein provide several advantages. For example, quickly presenting or displaying risks makes aerial flights safer. The unique visualization also is more convenient and efficient for pilots/controllers to plan flying journeys. The intuitive presentation also enables faster reaction time for pilots/controllers who need to react to changing conditions during a flight. As another advantage, the embodiments of risk data layers/models which is often invisible to the naked eye.

Although the various embodiments are discussed with respect to aerial flights, it is contemplated that the embodiments for visualizing risk levels can be used for other applications such as but not limited to off-road travel, optimizing traffic flows, determining insurance coverage, and/or any other application where aggregated risks are to be visualized.

The geographic and/or three-dimensional region can include any location or region for which manmade environmental factors are to be predicted. The region can be specified as a point location with a surround radius, as a bounded region, etc. The region of interest can also be specified as a point of interest (e.g., a building, structure, park, etc.) or geopolitical boundary (e.g., neighborhood, city, state, region, country, etc.). In one embodiment, the data ingestion module 203 retrieves or otherwise determines relevant data for the location. Such data might include industrial-activity data (e.g., source of smog) which includes any data that can be sensed, reported, recorded, stored, etc. that is associated with or indicative of any industrial activity producing geo-referenced environmental factors within the region of interest. As an example, the data ingestion module 203 can determine the industrial-activity data from any of a plurality of data sources. These data sources can be provided, for instance, by the services platform 111, services 113a-113n (also collectively referred to as services 113), content providers 115a-115m (also collectively referred to as content providers 115), and/or equivalent platforms. By way of example, the plurality of data sources can include but is not limited to any combination or subset of:

Online industrial activity data;
Weather manipulation data;
Positioning data from a mobile device in events (e.g., UE 107);
Traffic data near industrial activity;
NASA air quality tracking data; and
Municipal industrial-activity data.

In one embodiment, input features can be extracted from the industrial-activity data and/or weather manipulation data to support geo-referenced environmental factor prediction according to the embodiments described herein and then processed using the machine learning model 211.

In one embodiment, the prediction of geo-referenced manmade environmental factors is generated based on a trained machine learning model 211. The trained machine learning model 211, for instance, is trained using ground truth data correlating reference historical weather manipulation activity data to ground truth geo-referenced environmental factor data. Accordingly, in one embodiment, the data ingestion module 203 can acquire ground truth data from one or more locations that are like expected regions of interest. The ground truth data, for instance, correlates reference historical geo-referenced environmental factor data to ground truth geo-referenced environmental factor data. Reference historical geo-referenced environmental factor data includes one or more input data sources with known values or parameters. The set of known geo-referenced environmental factor data values can be referred to as ground truth input feature sets. These feature sets can then be labeled with ground truth geo-referenced environmental factor data that reflects known geo-referenced environmental factor data or geo-referenced environmental factor data that has been accepted or otherwise treated as the true geo-referenced environmental factor data of a region exhibiting the reference geo-referenced environmental data values. It should be noted that geo-reference environmental factor data can include data on manmade/manipulated weather and/or naturally occurring weather.

As discussed above, the machine learning model 211 uses training or ground truth data to automatically "learn" or detect relationships between different input feature sets and then output predicted manmade environmental factors based on those feature sets. In one embodiment, at least one of the input features or values includes a temporal parameter that indicates the times at which the ground input feature sets and corresponding ground truth manmade environmental factors was collected or determined. In this way, the trained machine learning model 211 can include time as a dynamic parameter so that the machine learning model 211 can learn the relationship between manmade environmental factors and time. For example, the dynamic parameter can provide for the prediction of the manmade environmental factors with respect to a time of day, a day, a week, a season, a year, or a combination thereof.

In one embodiment, the machine learning model 211 can be trained using the acquired ground truth training data set. For example, the routing platform 117 can incorporate a supervised learning model (e.g., a logistic regression model, Random Forest model, and/or any equivalent model) to provide feature matching probabilities that are learned from the training data set. For example, during training, the prediction module 209 uses a learner module that feeds input feature sets from the ground truth training data set into the machine learning model 211 to compute a predicted manmade environmental factor using an initial set of model parameters. The learner module then compares the predicted matching probability of the predicted manmade environmental factor feature to the ground truth manmade environmental factor data for each input feature set in the ground truth training data set. The learner module then computes an accuracy of the predictions for the initial set of model parameters. The prediction of the manmade environmental factor can then be further based on the relative weighting information among the input features to train the machine learning model 211.

To use the trained machine learning model 211 to make predictions, the prediction module 209 selects or receives an input for selecting a time for which the environmental factor data density and/or intensity prediction is to be made. The selected time can be any time in the future or the past. For example, in an aerial vehicle 101 use case, a future time can be selected to correspond to when the aerial vehicle 101 is expected to arrive or fly over the selected region of interest to assist in assessing the risk to the drone and/or its cargo within a geographic and/or three-dimensional region.

In one embodiment, after generating the dynamic prediction, the output module 213 can generate a visual representation of the geo-referenced manmade environmental factors. Examples of such a visual representation is shown in FIGS. 4A-4B.

Returning to FIG. 1, as shown, the system 100 comprises an aerial vehicle 101 equipped with a variety of sensors that is capable operating in airspaces overpopulated or unpopulated regions. In one embodiment, the aerial vehicle 101 can fly or otherwise operate autonomously or under direct control via the UE 107 that may include or be associated with one or more software applications 119 supporting routing based on risk level predictions and/or visualizations according to the embodiments described herein. As previously discussed, the system 100 further includes routing platform 117 coupled to the geographic database 121, wherein the routing platform 117 performs the functions associated with visualizing risk levels, providing dynamic airborne pesticide density prediction, and/or aerial vehicle routing as discussed with respect to the various embodiments described herein. In one embodiment, the aerial vehicle 101, routing platform 117, UE 107, and other components of the system 100 have connectivity to each other via the communication network 109.

In one embodiment, the aerial vehicle 101 can operate autonomously or via a remote pilot using UE 107 to fly the aerial vehicle 101 or configure a flight path or route for the aerial vehicle 101. In one embodiment, the aerial vehicle 101 is configured to travel using one or more modes of operation above populated or unpopulated regions. The aerial vehicle 101 many include any number of sensors including cameras, recording devices, communication devices, weather measuring tools (e.g., thermometer, barometer, hygrometer, and rain gauges), etc. By way example, the sensors may include, but are not limited to, a global positioning system (GPS) sensor for gathering location data based on signals from a positioning satellite, Light Detection And Ranging (LIDAR) for gathering distance data and/or generating depth maps, a network detection sensor for detecting wireless signals or receivers for different short-range communications (e.g., Bluetooth®, Wireless Fidelity (Wi-Fi), Li-Fi, Near Field Communication (NFC), etc.), temporal information sensors, a camera/imaging sensor for gathering image data, and the like. The aerial vehicle 101 may also include recording devices for recording, storing, and/or streaming sensor and/or other telemetry data to the UE 107 and/or the routing platform 117 for mapping or routing.

In one embodiment, the aerial vehicle 101 is capable of being configured with and executing at least one route based on visualized risk levels, dynamic predictions according to the embodiments described herein. The aerial vehicle 101 can also be configured avoid regions with high risk levels, populated regions, objects, and/or obstructions. In addition, the aerial vehicle 101 can be configured to observe restricted paths or routes. For example, the restricted paths may be based on governmental regulations that govern/restrict the path that the aerial vehicle 101 may fly (e.g., Federal Aviation Administration (FAA) policies regarding required distances between objects). In one embodiment, the system 100 may also consider one or more pertinent environmental or (manmade and/or naturally existing) weather conditions (e.g., rain, water levels, sheer winds, etc. in and around underground passageways and their entry/exit points) in determining a route or flight path.

In one embodiment, the aerial vehicle 101 may determine contextual information such as wind and weather conditions in route that may affect the aerial vehicle 101's ability to follow the specified route and then relay this information in substantially real-time to the system 100. In one embodiment, the aerial vehicle 101 may request one or more modifications of the flight path based, at least in part, on the determination of the contextual information or a change in the real-time calculated risk levels over regions of interest (e.g., newly detected or updated risk factors causing a sudden and unexpected change in risk levels). In one embodiment, the system 100 creates a data object to represent the navigation route and may automatically modify the route data object based on receipt of the contextual information from the aerial vehicle 101 or another source and then transmit the new route object to the aerial vehicle 101 for execution. In one embodiment, the aerial vehicle 101 can determine or access the new route data object and/or determine or access just the relevant portions and adjust its current path accordingly. For example, if multiple highly dense airborne smog regions (e.g., buildings) are encountered, the system 100 may condense the width of the aerial vehicle 101's flight path to better ensure that the aerial vehicle 101 will avoid the highly dense smog regions.

By way of example, a UE 107 is any type of dedicated aerial vehicle control unit, mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that a UE 107 can support any type of interface to the user (such as "wearable" circuitry, etc.). In one embodiment, a UE 107 may support any type of interface for piloting or routing the aerial vehicle 101. In addition, a UE 107 may facilitate various input means for receiving and generating information, including, but not restricted to, a touch screen capability, a keyboard and keypad data entry, a voice-based input mechanism, and the like. Any known and future implementations of a UE 107 may also be applicable.

By way of example, the UE 107 and/or the aerial vehicle 101 may execute applications 119, which may include various applications such as a risk visualization application, an aerial routing application, a location-based service application, a navigation application, a content provisioning application, a camera/imaging application, a media player application, an e-commerce application, a social networking application, and/or the like. In one embodiment, the applications 119 may include one or more feature applications used for visualizing risk levels according to the embodiments described herein. In one embodiment, the application 119 may act as a client for the routing platform 117 and perform one or more functions of the routing platform 117. In one embodiment, an application 119 may be considered as a Graphical User Interface (GUI) that can enable a user to configure a route or flight path for execution by aerial vehicle 101 according to the embodiments described herein.

In one embodiment, the communication network 109 of system 100 includes one or more networks such as a data network, a wireless network, a telephony network, or any combination thereof. It is contemplated that the data network may be any local region network (LAN), metropolitan region network (MAN), wide region network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the routing platform 117 can interact with the services platform 111 to receive data (e.g., airborne pesticide density data from a plurality of data sources.) for providing routing or operation of the aerial vehicle 101 based on dynamic smog density predictions. By way of example, the services platform 111 may include one or more services 113 for providing content (e.g., agricultural activity data, ground truth data, etc.), provisioning services, application services, storage services, mapping services, navigation services, contextual information determination services, location-based services, information-based services (e.g., weather), etc. In one embodiment, the services platform 111 may interact with the aerial vehicle 101, UE 107, and/or routing platform 117 to supplement or aid in providing dynamic smog predictions.

By way of example, the aerial vehicle 101, UE 107, routing platform 117, and the services platform 111 communicate with each other and other components of the system 100 using well known, new or still developing protocols. In this context, a protocol includes a set of rules defining how the network nodes within the system 100 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a protocol, and (2) payload information that follows the header information and contains information that may be processed independently of that protocol. In some protocols, the packet includes (3) trailer information following the payload and indicating the end of the payload information. The header includes information such as the source of the packet, its destination, the length of the payload, and other properties used by the protocol. Often, the data in the payload for the protocol includes a header and payload for a different protocol associated with a different, higher layer of the OSI Reference Model. The header for a protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 5:
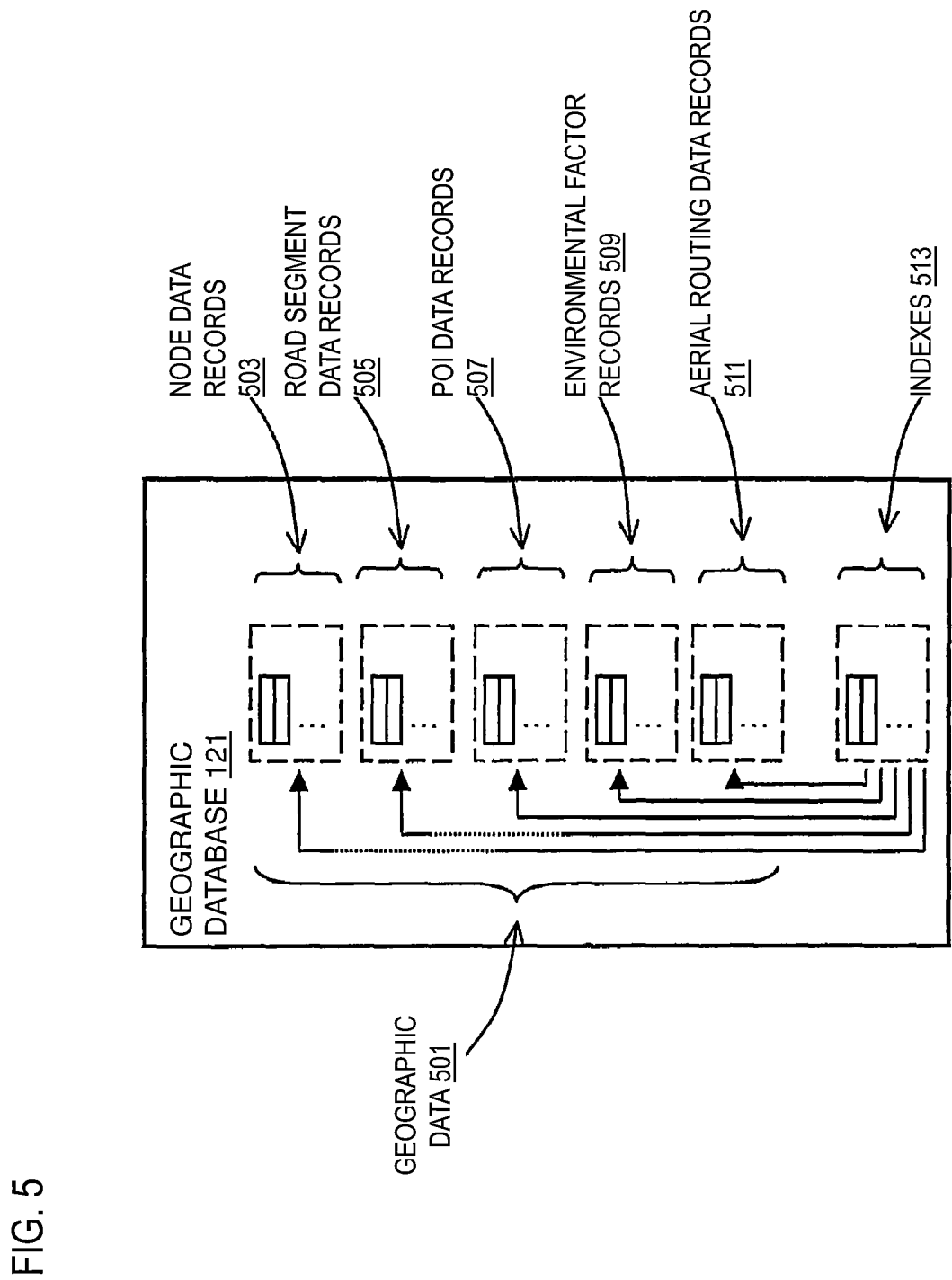
FIG. 5 is a diagram of a geographic database capable of storing map data for drone routing, according to one embodiment.

FIG. 5 is a diagram of a geographic database 121 capable of storing map data for environmental quality data density and/or intensity predictions, according to one embodiment. In one embodiment, the geographic database 121 includes geographic data 501 used for (or configured to be compiled to be used for) mapping and/or navigation-related services, such as for routing aerial vehicles based on geo-referenced environmental factors density data to create a 3D flightpath or route.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions, models, routes, etc. Accordingly, the terms polygons and polygon extrusions/models as used herein can be used interchangeably.

In one embodiment, the following terminology applies to the representation of geographic features in the geographic database 121.

"Node"—A point that terminates a link.

"Line segment"—A straight line connecting two points.

"Link" (or "edge") —A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior region of an outer boundary formed by a string of oriented links that begins and ends in one node. In one embodiment, a simple polygon does not cross itself.

"Polygon"—A region bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 121 follows certain conventions. For example, links do not cross themselves and do not cross each other except at a node. Also, there are no duplicated shape points, nodes, or links. Two links that connect each other have a common node. In the geographic database 121, overlapping geographic features are represented by overlapping polygons. When polygons overlap, the boundary of one polygon crosses the boundary of the other polygon. In the geographic database 121, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic data 501 of the database 121 includes node data records 503, road segment or link data records 505, POI data records 507, environmental factor data records (including data concerning weather manipulation and/or manmade weather events) 509, aerial routing data records 511, and indexes 513, for example. More, fewer or different data records can be provided. In one embodiment, additional data records (not shown) can include but are not limited to cartographic ("carto") data records, routing data, and maneuver data. As previously discussed, in some embodiments, the (manmade) environmental factor data records 509 are geo-referenced and can be mapped to an airspace (e.g., an airspace in which aerial vehicles 101 are operating). Accordingly, the geographic database 121 can include additional cartographic data records (not shown) that map or provide map coordinates (or equivalent map representations) of the airspace volumes corresponding to, affected by, and/or otherwise exhibiting the environmental factors indicated in the geo-referenced environmental factor data records 409. For example, these additional cartographic data records may be analogous to the nodes, links, POIs and/or various records 503-507 but extended into the airspace above the ground.

The environmental factor data records 509 may also include data concerning weather manipulation and/or manmade weather events such as cloud seeding (static, dynamic and hygroscopic), hail seeding, hurricane modification, smog production, cloud whitening, artificial upwelling, etc.

In one embodiment, the indexes 513 may improve the speed of data retrieval operations in the geographic database 121. In one embodiment, the indexes 513 may be used to quickly locate data without having to search every row in the geographic database 121 every time it is accessed. For example, in one embodiment, the indexes 513 can be a spatial index of the polygon points associated with stored feature polygons.

In exemplary embodiments, the road segment data records 505 are links or segments representing roads, streets, or paths, as can be used in the calculated route or recorded route information for determination of one or more personalized routes. The node data records 503 are end points corresponding to the respective links or segments of the road segment data records 505. The road link data records 505 and the node data records 503 represent a road network, such as used by vehicles, cars, and/or other entities. In addition, the geographic database 121 can contain path segment and node data records or other data that represent 3D paths around 3D map features (e.g., terrain features, buildings, other structures, etc.) that occur above street level, such as when routing or representing flightpaths of aerial vehicles (e.g., drones 101), for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 121 can include data about the POIs and their respective locations in the POI data records 507. The geographic database 121 can also include data about places, such as cities, towns, or other communities, and other geographic features, such as bodies of water, mountain ranges, etc. Such place or feature data can be part of the POI data records 507 or can be associated with POIs or POI data records 507 (such as a data point used for displaying or representing a position of a city).

In one embodiment, the geographic database 121 can also include (manmade) environmental factor data records 509 for the digital map data representing risk factors or risk-related data, calculated risk levels, risk level visualizations, environmental data density predictions generated for regions or interest, and related data. In one embodiment, the risk factor data records can be associated with one or more of the node records 503, road segment records 505, and/or POI data records 507 so that the predicted population densities can inherit characteristics, properties, metadata, etc. of the associated records (e.g., location, address, POI type, etc.). In one embodiment, the system 100 (e.g., via the routing platform 117 can use the environmental quality data density and/or intensity predictions to generate aerial vehicles routes.

In one embodiment, the system 100 can generate navigation routes using the digital map data and/or real-time data stored in the geographic database 121 based on risk level visualization and/or predictions. The resulting aerial routing and guidance can be stored in the aerial routing data records 511. By way of example, the routes stored in the data records 511 can be created for individual 3D flightpaths or routes as they are requested by drones or their operators. In this way, previously generated navigation routes can be reused for future drone travel to the same target location.

In one embodiment, the navigation routes stored in the aerial routing data records 511 can be specific to characteristics of the cargo 102 (e.g., type of item to be delivered, packaging type) and/or other geo-referenced environmental factor characteristics of the route. In addition, the navigation routes generated according to the embodiments described herein can be based on contextual parameters (e.g., time-of-day, day-of-week, season, etc.) that can be used with different environmental quality data density and/or intensity predictions according to the embodiments described herein.

In one embodiment, the geographic database 121 can be maintained by the services platform 111, any of the services 113 of the services platform 111, and/or the routing platform 117). The map developer can collect environmental quality data to generate and enhance the geographic database 121. There can be different ways used by the map developer to collect data. These ways can include obtaining data from other sources, such as municipalities or respective geographic authorities. In addition, the map developer can employ drones (e.g., using the embodiments of the privacy-routing process described herein) or field vehicles (e.g., mapping drones or vehicles equipped with mapping sensor arrays, e.g., LIDAR) to travel along roads and/or within buildings/structures throughout the geographic region to observe features and/or record information about them, for example. Also, remote sensing, such as aerial or satellite photography or other sensor data, can be used.

The geographic database 121 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, environmental data is compiled (such as into a platform specification format (PSF) format) to organize and/or configure the data for performing navigation-related functions and/or services, such as route calculation, route guidance, map display, speed calculation, distance and travel time functions, and other functions, by a navigation capable device or vehicle, such as by the aerial vehicle 101, for example. The navigation-related functions can correspond to 3D flightpath or navigation, 3D route planning for package delivery, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for mapping environmental factors and generating navigation routes may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
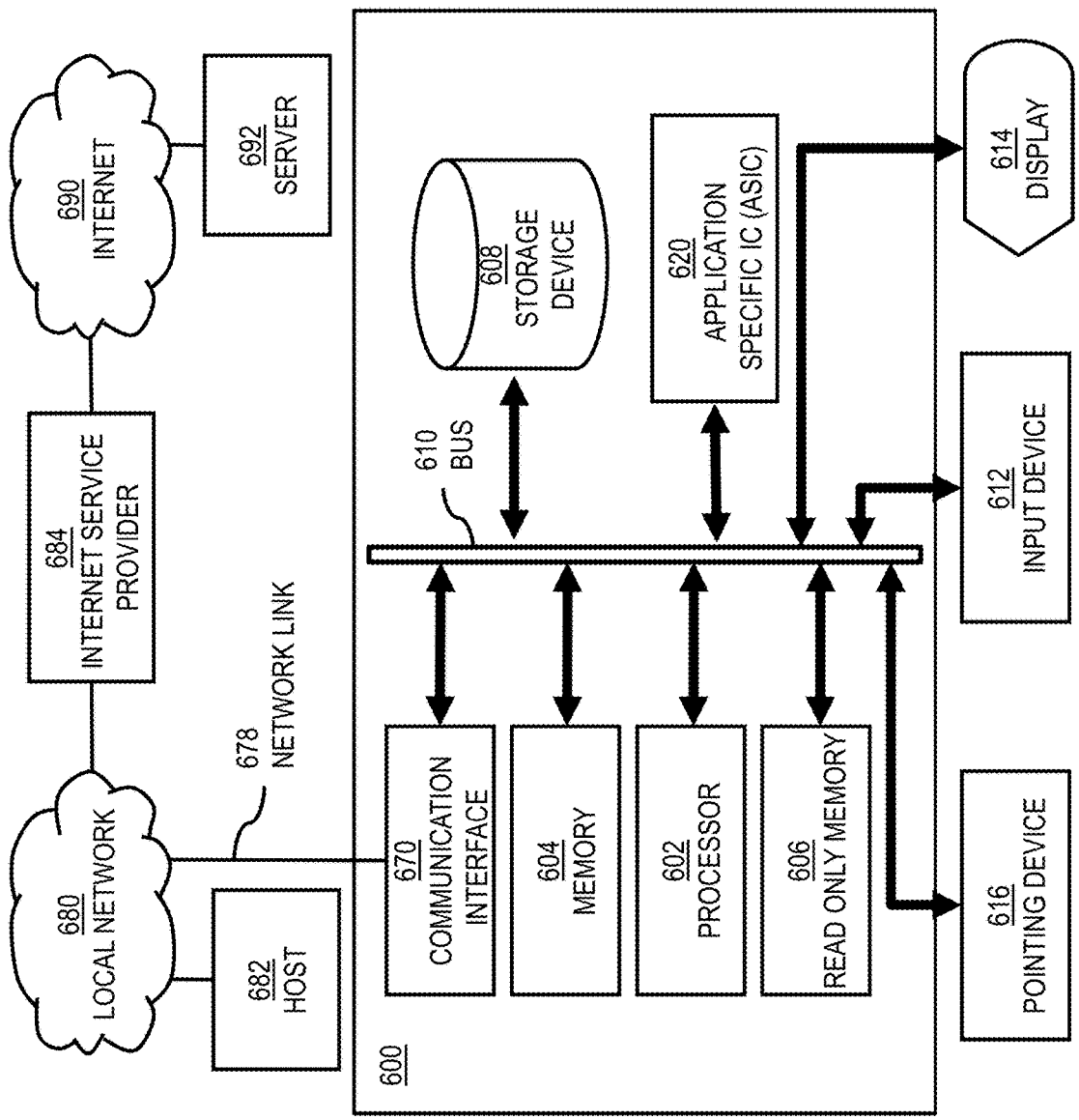
FIG. 6 is a diagram of hardware that can be used to implement an embodiment.

FIG. 6 illustrates a computer system 600 upon which an embodiment of the invention may be implemented. Computer system 600 is programmed (e.g., via computer program code or instructions) to map environmental factors (manmade and otherwise) and generate navigation routes as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a range.

A bus 610 includes one or more parallel conductors of information so that information is transferred quickly among devices coupled to the bus 610. One or more processors 602 for processing information are coupled with the bus 610.

A processor 602 performs a set of operations on information as specified by computer program code related to mapping environmental factors and generating navigation routes. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for mapping manmade environmental factors and generating navigation routes. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for mapping environmental factors and generating navigation routes, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general, the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local region network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for mapping geo-referenced environmental factors and generating navigation routes to the UE 101.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system can be deployed in various configurations within other computer systems, e.g., host 682 and server 692.

FIG. 7 illustrates a chip set 700 upon which an embodiment of the invention may be implemented. Chip set 700 is programmed to map geo-referenced manmade environmental factors and generate navigation routes as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to map geo-referenced environmental factors and generate navigation routes. The memory 705 also stores the data associated with or generated by the execution of the inventive steps.

Figure 8:
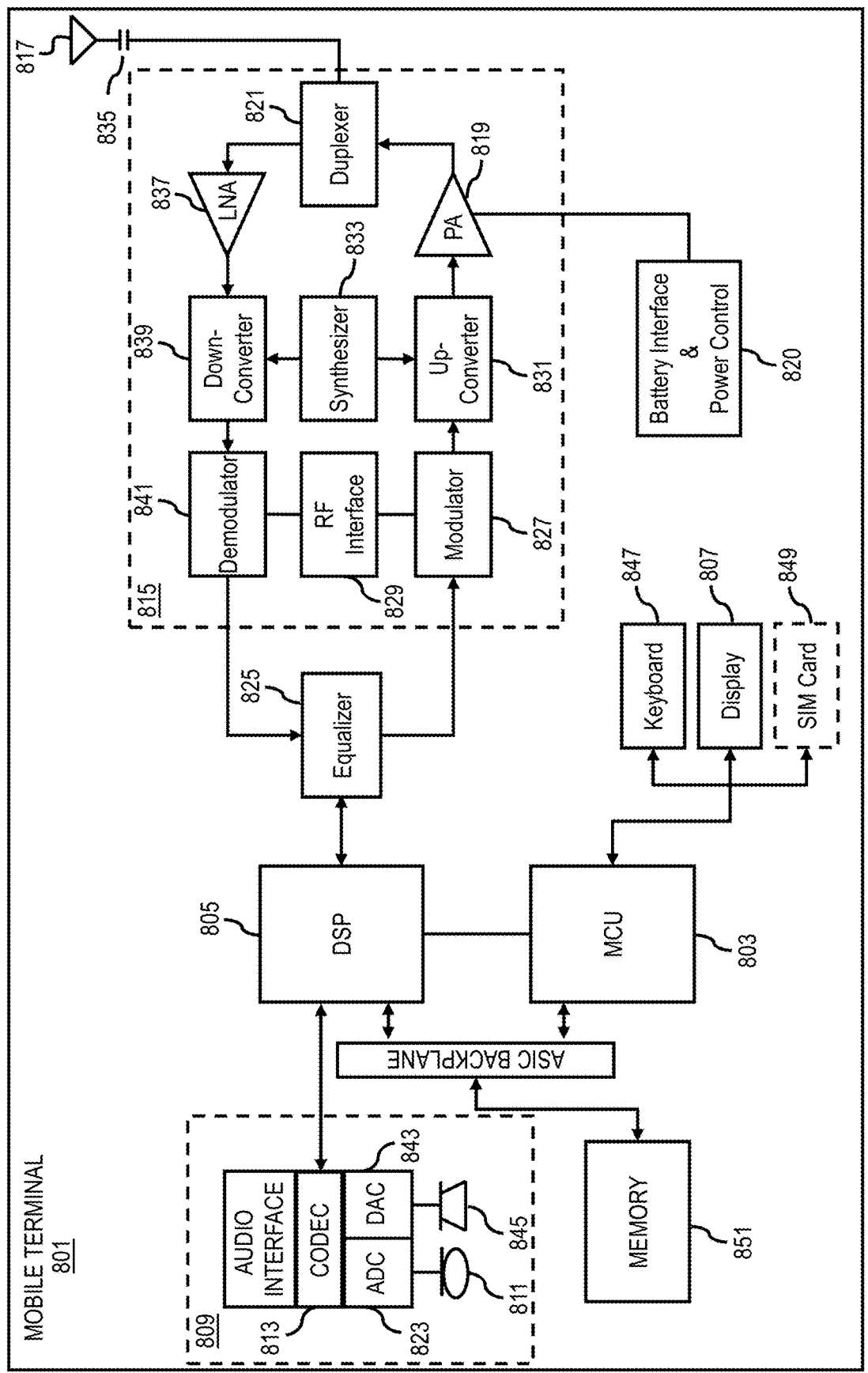
FIG. 8 is a diagram of a mobile terminal (e.g., handset or vehicle or part thereof) that can be used to implement an embodiment.

FIG. 8 is a diagram of exemplary components of a mobile terminal 801 (e.g., handset or vehicle/aerial vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile station functions that offer automatic contact matching. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile station 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, 5G, 6G, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile station 801 to map environmental factors and generate navigation routes. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the station. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile station 801.

The CODEC 813 includes the ADC 823 and DAC 843. The memory 851 stores various data including call incoming tone data and can store other data including music data received via, e.g., the global Internet. The software module could reside in RAM memory, flash memory, registers, or any other form of writable computer-readable storage medium known in the art including non-transitory computer-readable storage medium. For example, the memory device 851 may be, but not limited to, a single memory, CD, DVD, ROM, RAM, EEPROM, optical storage, or any other non-volatile or non-transitory storage medium capable of storing digital data.

An optionally incorporated SIM card 849 carries, for instance, important information, such as the cellular phone number, the carrier supplying service, subscription details, and security information. The SIM card 849 serves primarily to identify the mobile station 801 on a radio network. The card 849 also contains a memory for storing a personal telephone number registry, text messages, and user specific mobile station settings.

While the invention has been described in connection with several embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed:

1. A method for generating a navigation route based on weather manipulation data comprising:
   initiating an activation of at least one sensor of an aerial drone, wherein the at least one sensor is configured to collect, in real time, sensor data for determining a presence of at least one cloud which has been seeded to produce rain, wherein the sensor data is used to update map data associated with the at least one cloud which has been seeded to produce rain;
   receiving map data, wherein the map data includes weather manipulation data for a three-dimensional region associated with at least one candidate route, wherein the weather manipulation data includes the sensor data which indicates whether there is at least one cloud which has been seeded to produce rain present and an altitude extent of the at least one cloud which has been seeded to produce rain;
   generating the navigation route based on the weather manipulation data for at least one candidate route, wherein the navigation route is generated for flight of an aerial drone, and wherein the navigation route specifies an altitude to route the aerial drone based on the presence of at least one cloud which has been seeded to produce rain, wherein the at least one cloud which has been seeded to produce rain aids the flight of the aerial drone;
   calculating a probability of encountering the at least one cloud which has been seeded to produce rain while on the navigation route;
   selecting a candidate route for navigating an aerial drone, wherein the selected candidate route increases flight range for the aerial drone; and
   initiating an autonomous control for a drone based in part on the calculated probability of encountering the cloud which has been seeded to produce rain and the selected candidate route.

2. The method of claim 1, wherein the navigation route is generated to avoid the at least one cloud which has been seeded to produce rain.

3. The method of claim 1, wherein the navigation route is generated to route through the at least one cloud which has been seeded to produce rain.

4. The method of claim 3, wherein the navigation route generated through the at least one cloud which has been seeded to produce rain avoids a portion of the cloud which has been seeded to produce rain.

5. The method of claim 1, wherein the at least one cloud which has been seeded to produce rain is classified as affecting cargo carried by a drone based on determining that the at least one cloud which has been seeded to produce rain negatively affects the cargo so that the cargo cannot be consumed or used in a manner for which the cargo was made or designed.

* * * * *